(12) United States Patent
Takada et al.

(10) Patent No.: US 8,311,235 B2
(45) Date of Patent: Nov. 13, 2012

(54) COMMUNICATION CONTROL METHOD, COMMUNICATION SYSTEM AND COMPUTER PROGRAM

(75) Inventors: Tomoyuki Takada, Tokyo (JP); Yasushi Maeda, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 809 days.

(21) Appl. No.: 12/397,626

(22) Filed: Mar. 4, 2009

(65) Prior Publication Data

US 2009/0235000 A1     Sep. 17, 2009

(30) Foreign Application Priority Data

Mar. 12, 2008    (JP) ................................. 2008-063159

(51) Int. Cl.
*H04B 3/00*      (2006.01)
*H04B 7/00*      (2006.01)
*G08B 1/08*      (2006.01)

(52) U.S. Cl. .......... 381/77; 370/310; 370/465; 370/230; 370/254

(58) Field of Classification Search .................. 370/310, 370/315, 254, 230, 465; 455/557; 381/77; 340/538, 254
See application file for complete search history.

(56) References Cited

U.S. PATENT DOCUMENTS

| | | | | |
|---|---|---|---|---|
| 5,365,523 A | * | 11/1994 | Derby et al. | 370/402 |
| 6,690,657 B1 | * | 2/2004 | Lau et al. | 370/315 |
| 6,741,708 B1 | | 5/2004 | Nakatsugawa | |
| 6,804,195 B2 | * | 10/2004 | Izumi et al. | 370/230 |
| 7,099,483 B2 | * | 8/2006 | Inagaki | 381/77 |
| 7,339,466 B2 | * | 3/2008 | Mansfield et al. | 340/538 |
| 7,923,864 B2 | * | 4/2011 | Azuma et al. | 307/80 |
| 8,050,203 B2 | * | 11/2011 | Jacobsen et al. | 370/310 |
| 2006/0116164 A1 | * | 6/2006 | Kang | 455/557 |
| 2006/0268744 A1 | * | 11/2006 | Sakai et al. | 370/254 |

FOREIGN PATENT DOCUMENTS

JP      2001-127712      5/2001

* cited by examiner

*Primary Examiner* — Colleen Matthews
*Assistant Examiner* — Galina Yushina
(74) *Attorney, Agent, or Firm* — Cowan, Liebowitz & Latman, P.C.

(57) ABSTRACT

A method of controlling communication in a communication system includes a plurality of communication devices and a controller that transmits multi-channel data to the plurality of communication devices, executed in a communication device group to which power is supplied without passing through the controller, the method comprising the steps of determining a master communication device in the communication device group that sends the multi-channel data received wirelessly from the controller to other communication device included in the communication device group, according to wireless connection conditions between the controller and each communication device included in the communication device group, and sending, by the master via a wired connection, the multi-channel data received wirelessly from the controller to the other communication device included in the communication device group.

12 Claims, 13 Drawing Sheets

FIG. 6A

| MODE TYPE | DATA TYPE | EXTERNAL INPUT INTERFACE | PATH SWITCHING UNIT INPUT BLOCK (DEMODULATION BANDWIDTH *1) *1 DEMODULATION BLOCK | PATH SWITCHING UNIT OUTPUT BLOCK (MODULATION BANDWIDTH *2) *2 MODULATION BLOCK | EXTERNAL OUTPUT INTERFACE | REMARK (DATA DETAILS) |
|---|---|---|---|---|---|---|
| MODE 00 TEMPORARY MASTER MODE (USED BY DEFAULT) | DOWNLINK DATA | - | FRAME GENERATION UNIT 524 | OFDM MODULATION UNIT 509 (WIRED DOWNLINK BANDWIDTH) | WIRED OUTPUT TERMINAL 513 | COMMAND |
| | | | | OFDM MODULATION UNIT 510 (WIRED DOWNLINK BANDWIDTH) | WIRED OUTPUT TERMINAL 514 | |
| | UPLINK DATA | WIRED OUTPUT TERMINAL 513 | OFDM DEMODULATION UNIT 518 (WIRED UPLINK BANDWIDTH) | CONTROL UNIT 500 | - | STATUS DATA |
| | | WIRED OUTPUT TERMINAL 514 | OFDM DEMODULATION UNIT 519 (WIRED UPLINK BANDWIDTH) | | | |
| MODE 01 TEMPORARY SLAVE MODE (USED AT INITIAL SETTING CONNECTION AND BEFORE CONNECTION CONFIGURATION IS INFORMED) | DOWNLINK DATA | WIRED INPUT TERMINAL 501 | OFDM DEMODULATION UNIT 504 (WIRED DOWNLINK BANDWIDTH) | REPRODUCTION PROCESSING UNIT 506 | - | COMMAND |
| | | | | OFDM MODULATION UNIT 509 (WIRED DOWNLINK BANDWIDTH) | WIRED OUTPUT TERMINAL 513 | |
| | | | | OFDM MODULATION UNIT 510 (WIRED DOWNLINK BANDWIDTH) | WIRED OUTPUT TERMINAL 514 | |
| | UPLINK DATA | - | CONTROL UNIT 500 | OFDM MODULATION UNIT 520 (WIRED UPLINK BANDWIDTH) | WIRED INPUT TERMINAL 501 | CONNECTION CONFIGURATION INFORMATION |
| | | WIRED OUTPUT TERMINAL 513 | OFDM DEMODULATION UNIT 518 (WIRED UPLINK BANDWIDTH) | CONTROL UNIT 500 | - | |
| | | WIRED OUTPUT TERMINAL 514 | OFDM DEMODULATION UNIT 519 (WIRED UPLINK BANDWIDTH) | | | |

FIG. 6B

| Mode | Direction | Input | Stage 1 | Stage 2 | Stage 3 | Output | Data |
|---|---|---|---|---|---|---|---|
| MODE 10 SLAVE MODE — TEMPORARY SLAVE MODE (USED AT INITIAL SETTING CONNECTION AND AFTER CONNECTION CONFIGURATION IS INFORMED) | DOWN-LINK DATA | WIRED INPUT TERMINAL 501 | OFDM DEMODULATION UNIT 504 (WIRED DOWNLINK BANDWIDTH) | REPRODUCTION PROCESSING UNIT 506 | — | WIRED OUTPUT TERMINAL 513 | AUDIO DATA, COMMAND |
| | UPLINK DATA | — | CONTROL UNIT 500 | OFDM MODULATION UNIT 509 (WIRED DOWNLINK BANDWIDTH) | WIRED OUTPUT TERMINAL 513 | | |
| | | WIRED OUTPUT TERMINAL 513 | OFDM DEMODULATION UNIT 518 (WIRED UPLINK BANDWIDTH) | OFDM MODULATION UNIT 510 (WIRED DOWNLINK BANDWIDTH) | WIRED OUTPUT TERMINAL 514 | | |
| | | WIRED OUTPUT TERMINAL 514 | OFDM DEMODULATION UNIT 519 (WIRED UPLINK BANDWIDTH) | OFDM MODULATION UNIT 520 (WIRED UPLINK BANDWIDTH) | WIRED INPUT TERMINAL 501 | | STATUS DATA |
| MODE 20 MASTER MODE (USED ONLY IN WIRELESS CONNECTION ADAPTER GROUP) | DOWN-LINK DATA | RECEIVING ANTENNA | WIRELESS RECEPTION DEMODULATION UNIT 517 (WIRELESS DOWNLINK BANDWIDTH) | REPRODUCTION PROCESSING UNIT 506 | — | WIRED OUTPUT TERMINAL 513 | AUDIO DATA, COMMAND |
| | UPLINK DATA | — | CONTROL UNIT 500 | OFDM MODULATION UNIT 509 (WIRED DOWNLINK BANDWIDTH) | WIRED OUTPUT TERMINAL 513 | | |
| | | WIRED OUTPUT TERMINAL 513 | OFDM DEMODULATION UNIT 518 (WIRED UPLINK BANDWIDTH) | OFDM MODULATION UNIT 510 (WIRED DOWNLINK BANDWIDTH) | WIRED OUTPUT TERMINAL 514 | | |
| | | WIRED OUTPUT TERMINAL 514 | OFDM DEMODULATION UNIT 519 (WIRED UPLINK BANDWIDTH) | OFDM MODULATION UNIT 520 (WIRELESS UPLINK BANDWIDTH) | WIRELESS MODULATION SENDING UNIT 521 | SENDING ANTENNA | STATUS DATA |

FIG. 6C

| | | | | | | | |
|---|---|---|---|---|---|---|---|
| MODE 21 | DOWNLINK DATA | WIRED OUTPUT TERMINAL 513 | OFDM DEMODULATION UNIT 518 (WIRED DOWNLINK BANDWIDTH) | REPRODUCTION PROCESSING UNIT 506 | — | WIRED INPUT TERMINAL 501 | AUDIO DATA, COMMAND |
| SLAVE MODE (USED ONLY IN WIRELESS CONNECTION ADAPTER GROUP) | | | | | OFDM MODULATION UNIT 520 (WIRED DOWNLINK BANDWIDTH) | WIRED OUTPUT TERMINAL 514 | |
| | UPLINK DATA | — | CONTROL UNIT 500 | OFDM MODULATION UNIT 509 (WIRED UPLINK BANDWIDTH) | WIRED OUTPUT TERMINAL 513 | STATUS DATA | |
| | | WIRED OUTPUT TERMINAL 514 | OFDM DEMODULATION UNIT 504 (WIRED UPLINK BANDWIDTH) | | | | |
| MODE 22 | DOWNLINK DATA | WIRED OUTPUT TERMINAL 514 | OFDM DEMODULATION UNIT 519 (WIRED UPLINK BANDWIDTH) | REPRODUCTION PROCESSING UNIT 506 | — | WIRED INPUT TERMINAL 501 | AUDIO DATA, COMMAND |
| SLAVE MODE (USED ONLY IN WIRELESS CONNECTION ADAPTER GROUP) | | | | | OFDM MODULATION UNIT 520 (WIRED DOWNLINK BANDWIDTH) | WIRED OUTPUT TERMINAL 513 | |
| | UPLINK DATA | — | CONTROL UNIT 500 | OFDM MODULATION UNIT 509 (WIRED UPLINK BANDWIDTH) | WIRED OUTPUT TERMINAL 514 | STATUS DATA | |
| | | WIRED OUTPUT TERMINAL 513 | OFDM DEMODULATION UNIT 518 (WIRED DOWNLINK BANDWIDTH) | | | | |

COMMUNICATION CONTROL METHOD, COMMUNICATION SYSTEM AND COMPUTER PROGRAM

BACKGROUND OF THE INVENTION

1. Field of the Invention

The present invention relates to a communication control method, a communication system, and a computer program.

2. Description of the Related Art

There has been proposed a surround system in which audio data is wirelessly transmitted from an audio source device to a plurality of active speakers (Japanese Patent Laid-Open No. 2001-127712).

SUMMARY OF THE INVENTION

In the proposed technique, because the radio wave environment between the audio source device and speakers is different for every speaker, the communication quality for some speakers may not be favorable. In this case, a conceivable method is to use cables to connect the audio source device and a speaker in an unfavorable radio wave environment, but because the audio source device and the speaker are often disposed at a distance from each other, the cable would cross rooms and people's paths, and so on, and there may be a case where the cable connection is a problem. Also, it is necessary that the plurality of speakers are respectively connected with cables to power source outlets that are provided at limited places to obtain electric power, which is inconvenient for users.

Thus, the present invention ensures freedom in positional relationship between a data source device and a plurality of data synchronization devices that are suitable for a surround system and the like, with relatively favorable communication quality between these devices. The present invention also improves inconvenient usability due to the positional limitation of power source outlets.

One aspect of the embodiments of the present invention relates to a method of controlling communication in a communication system includes a plurality of communication devices and a controller that transmits multi-channel data to the plurality of communication devices, executed in a communication device group to which power is supplied without passing through the controller, the method comprising the steps of determining a master communication device in the communication device group that sends the multi-channel data received wirelessly from the controller to other communication device included in the communication device group, according to wireless connection conditions between the controller and each communication device included in the communication device group, and sending, by the master via a wired connection, the multi-channel data received wirelessly from the controller to the other communication device included in the communication device group.

Another aspect of the embodiments of the present invention relates to a method of controlling communication in a communication system includes a plurality of communication devices and a controller that transmits multi-channel data to the plurality of communication devices, executed by a communication device in a communication device group to which power is supplied without passing through the controller, the method comprising a determining step of determining a master communication device in the communication device group that sends the multi-channel data received wirelessly from the controller to other communication device included in the communication device group, according to wireless connection conditions between the controller and each communication device included in the communication device group, and a sending step of causing the master to send the multi-channel data received wirelessly from the controller via a wired connection to the other communication device included in the communication device group.

Further features of the present invention will become apparent from the following description of exemplary embodiments (with reference to the attached drawings).

BRIEF DESCRIPTION OF THE DRAWINGS

FIG. 6A, FIG. 6B and FIG. 6C are diagrams illustrating data paths in respective modes of the adapters 110 to 115 according to the embodiment of the present invention.

DESCRIPTION OF THE EMBODIMENTS

Embodiments of the present invention are described hereinafter with reference to the attached drawings.

First Embodiment

Figure 1:
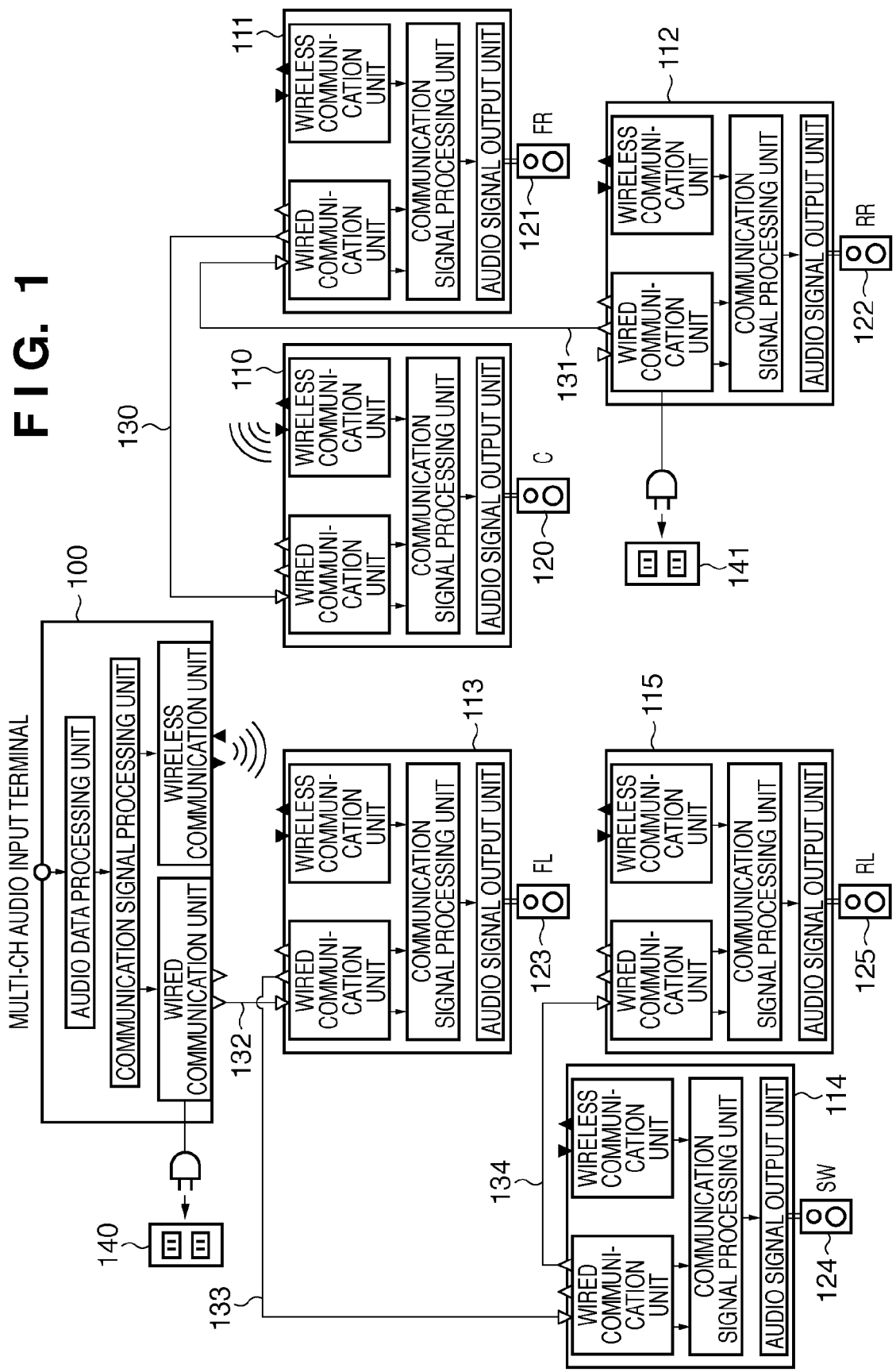
FIG. 1 is a block diagram illustrating an example of a system configuration according to the embodiment of the present invention.

An embodiment of the present invention is described below. FIG. 1 is a block diagram illustrating an example of a configuration in a sound communication system as a 5.1 channel surround system to which the present invention has been applied.

A speaker controller (hereinafter, referred to as a "controller") 100 decodes multi-channel data input from an optical disc player and the like and generates data for each channel. In this embodiment, the controller 100 decodes multi-channel audio data and generates audio data for respective channels. The controller 100 corrects frequency characteristics and the like of the generated audio data for respective channels. Afterwards, the controller 100 allocates the audio data of respective channels along with a command to time slots of a synchronous transmission frame (to be described later in FIG. 2), and sends the data to adapters. Destination adapters at this time include a wire-connected adapter (an adapter 113 in FIG. 1) that is connected using a power line communication (PLC) cable, and a wirelessly-connected adapter (an adapter 110 in FIG. 1).

Furthermore, the controller 100 receives data indicating status information (hereinafter, referred to as "status data") and the like sent from the adapters 110 to 115, from an adapter that is wire-connected with a power line communication cable and a wirelessly-connected adapter. The status information includes, for example, an ACK with respect to received data.

The adapters 110 to 115 receive a transmission frame that has been sent from the controller 100. To be more specific, some adapters out of a plurality of adapters are connected, with the power line communication cable or wirelessly, to the controller 100, and receive the transmission frame from the controller. Other adapters receive transmission data from adapters that are wire-connected with the power line communication cable on an uplink side (uplink data transmission direction (to be described later)).

Furthermore, among the adapters 110 to 115, adapters that are designated as temporary slave adapters (to be described later) by default receive a transmission frame that has been sent from adapters that are designated as temporary master adapters (to be described later), from adapters that are wire-connected on the uplink side with the power line communication cables.

When adapters that are connected with the power line communication cables on the downlink side (downlink data transmission direction (to be described later)) are present, the adapters 110 to 115 send the received transmission frame via a wired connection to the adapters. That is, the adapters 110 to 115 relay the received transmission frame to the adapters that are connected on the downlink side with the power line communication cables. Furthermore, when designated as temporary master adapters by default, the adapters 110 to 115 allocate commands to time slots in synchronous transmission frames, and send the commands to the adapters that are connected on the downlink side with the power line communication cables.

Audio channels are assigned to the adapters 110 to 115 based on the placement of speakers 120 to 125, that is, sound reproducing devices that are to be connected to the adapters 110 to 115. In FIG. 1, the adapters 110 to 115 are assigned to channels of center (C), front right (FR), rear right (RR), front left (FL), subwoofer (SW), and rear left (RL), respectively.

The adapters 110 to 115 obtain audio data for a channel that is assigned to themselves and a command from the received transmission frame. The adapters 110 to 115 operate according to the obtained command. The adapters 110 to 115 add corrections based on speaker characteristics and the like to the obtained audio data. Afterwards, the adapters 110 to 115 perform digital-analog (D/A) conversion on the audio data, amplify the data and generate audio signals, and output the signals to respective speakers 120 to 125. At this time, in order to reproduce multi-channel audio data properly, the adapters 110 to 115 generate the audio signals at a predetermined timing based on the instruction of the controller 100, and output the signals to respective speakers 120 to 125.

The adapters 110 to 115 send status data relating to themselves to the controller 100 that is connected thereto with the power line communication cable or wirelessly, or to adapters connected thereto with the power line communication cable on the uplink side.

Furthermore, the adapters 110 to 115 receive status data from adapters that are connected thereto on the downlink side with the power line communication cable. Then, the adapters 110 to 115 send, that is, relay, the received status data to the controller 100 that is connected thereto with the power line communication cable or wirelessly, or to adapters that are connected thereto with the power line communication cable on the uplink side. Although the adapters connected to the speakers are illustrated as an example of a communication device in the present description, the speakers themselves may be provided with the functions of the above-described adapters.

Hereinafter, data that is sent by the controller 100 to the adapters 110 to 115 and data that is sent by the temporary master adapters designated by default to the temporary slave adapters is referred to as "downlink data". Also, data sent from the adapters 110 to 115 to the controller 100, and status data sent by the temporary slave adapters designated by default to the temporary master adapter is referred to as "uplink data".

The speakers 120 to 125 are sound reproducing devices that convert audio signals input from the respective adapters 110 to 115 to mechanical vibrations, and output the audio signals/mechanical vibrations as sound.

The adapters 110 to 115 are connected to the speakers 120 to 125 respectively with cables. The adapters 110 to 115 may be provided in the speakers 120 to 125, respectively.

Power line communication cables 130 to 134 are cables that bring the communication devices into connection, and establish connection between the controller 100 and the adapters or between the adapters. In the power line communication cables, data and AC signals that convey electric power are multiplexed and transmitted. The power line communication cables are, for example, balanced dual-core cables, having a male plug at one end and a female plug at the other end.

Hereinafter, a wiring configuration of the power line communication cables 130 to 134 and a method of transmitting AC signals to each of the devices are described.

The power line communication cables 130 to 134 are wired from a wired output terminal of a device to a wired input terminal of another device in accordance with the transmission direction of the AC signals. The wired input terminal and the wired output terminal of the adapters are formed into a shape that allows the power line communication cable to be connected. For example, a female plug is connected to the wired output terminal, and a male plug is connected to the wired input terminal. In FIG. 1, the output terminals are illustrated with inverted triangles, and the input terminals are illustrated with triangles.

In FIG. 1, the controller 100 is connected to a power source outlet 140. A wired output terminal of the controller 100 and a wired input terminal of the adapter 113 are connected with the power line communication cable 132. Also, a wired output terminal of the adapter 113 and a wired input terminal of the adapter 114 are connected with the power line communication cable 133. Furthermore, a wired output terminal of the adapter 114 and a wired input terminal of the adapter 115 are connected with the power line communication cable 134. The AC signals are transmitted from the controller 100 to the adapter 113, from the adapter 113 to the adapter 114, and from the adapter 114 to the adapter 115.

Furthermore, the adapter 112 is connected to a power source outlet 141. A wired output terminal of the adapter 112 and a wired input terminal of the adapter 111, and a wired output terminal of the adapter 111 and a wired input terminal of the adapter 110 are connected with the power line communication cables 131 and 130, respectively. The AC signals (electric power) are transmitted from the adapter 112 to the adapter 111, and from the adapter 111 to the adapter 110, thereby supplying power. Power is thus supplied to an adapter group (communication device group) including the adapters 110, 111, and 112 without passing through the controller 100.

Next, a connection configuration in view of data paths is described. The path for downlink data in an assembly of adapters (adapters 113, 114, and 115 in FIG. 1) that does not include wireless paths for the data path to the controller 100 is the same as the case with AC signals. That is, these adapters receive downlink data from the controller 100 or the adapters that are connected to their wired input terminals. When there are adapters that are connected to their wired output terminals, the adapters send, that is, relay, the received data to the adapters that are connected to their wired output terminals.

In FIG. 1, the downlink data that is sent by the controller 100 to the adapters 110 to 115 is transmitted from the controller 100 to the adapter 113, from the adapter 113 to the adapter 114, and from the adapter 114 to the adapter 115. The path for uplink data is the reverse of the path for downlink data.

The data path for an assembly of adapters (adapters 110, 111, and 112 in FIG. 1) that includes a wireless path for the data path to the controller 100 (hereinafter, referred to as a "wireless connection adapter group") is to be described later.

Figure 2:
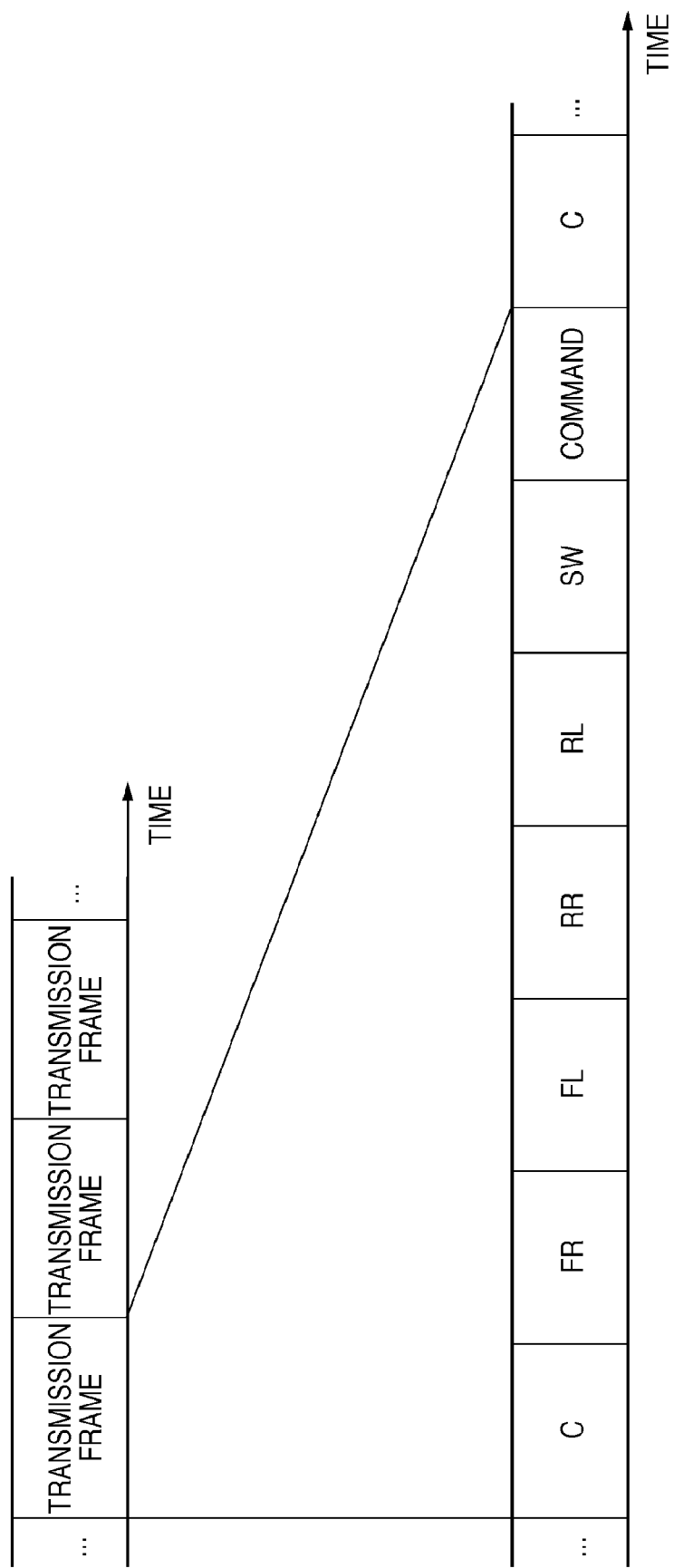
FIG. 2 is a diagram illustrating an example of a configuration of a transmission frame according to the embodiment of the present invention.

FIG. 2 is a diagram illustrating an example of a configuration of a transmission frame according to the embodiment of the present invention. A transmission frame has a predetermined data length, and is sent in predetermined cycles. The transmission frame is configured of a plurality of time slots in which audio data of each channel and commands are allocated. In the figure, the portions indicated as C, FR, FL, RR, and RL are time slots for allocating audio data of center, front right, front left, rear right, and rear left channels, respectively. The portion indicated as "command" is a time slot for allocating commands. One transmission frame includes audio data corresponding to one sampling point.

Figure 3:
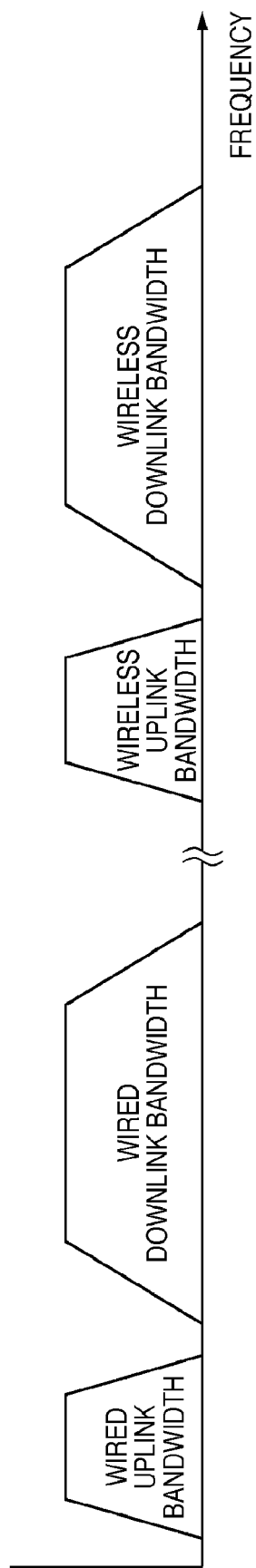
FIG. 3 is a diagram illustrating an example of relationships between transmission media, data transmission directions, and frequency bands according to the embodiment of the present invention.

FIG. 3 is a diagram illustrating an example of relationships between transmission media, data transmission directions, and frequency bands according to the embodiment of the present invention. As shown in FIG. 3, different frequency bands are used for wireless and wired transmission. Furthermore, downlink data and uplink data are transmitted with different frequency bands. The bandwidth for downlink data (downlink bandwidth) is positioned on the high-frequency side with respect to the bandwidth for uplink data (uplink bandwidth), and has a wider bandwidth.

Figure 4:
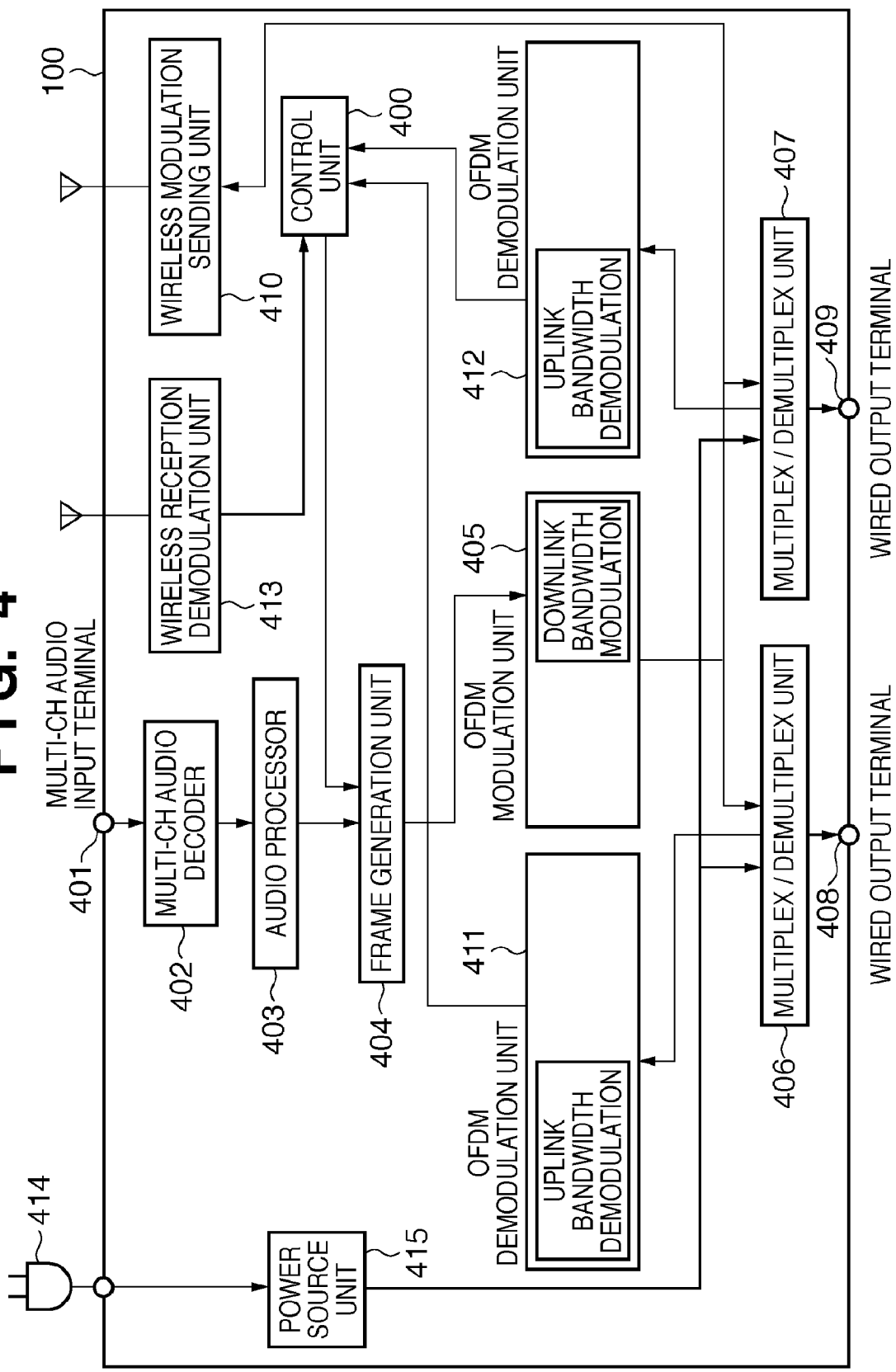
FIG. 4 is a block diagram illustrating an example of a functional configuration of a controller 100 according to the embodiment of the present invention.

Hereinafter, the configuration of the controller 100 included in the sound communication system of this embodiment is described with reference to FIG. 4. FIG. 4 is a block diagram illustrating an example of a functional configuration of the controller 100 according to the embodiment of the present invention. A control unit 400 controls each unit of the controller 100. In FIG. 4, signal lines between each unit are omitted for simplification of the figure. The control unit 400 outputs commands for the adapters 110 to 115 to a frame generation unit 404. Also, the control unit 400 is input with status data relating to the adapters 110 to 115 from OFDM demodulation units 411 and 412, and a wireless reception demodulation unit 413.

Optical disc players and the like are connected to a multi-channel audio input terminal 401, and multi-channel audio data is input thereto. A multi-channel audio decoder 402 decodes multi-channel audio data input from the multi-channel audio input terminal 401, and generates audio data for each channel. The multi-channel audio decoder 402 outputs the audio data for each channel to an audio processor 403.

The audio processor 403 adds corrections for frequency characteristics and the like to audio data of each channel input from the multi-channel audio decoder 402. The audio processor 403 outputs corrected audio data of each channel to the frame generation unit 404.

The frame generation unit 404 allocates audio data of each channel input from the audio processor 403 and commands input from the control unit 400 to the time slots in synchronous transmission frames, and generates a transmission frame. The frame generation unit 404 outputs the generated transmission frame to an OFDM modulation unit 405.

The Orthogonal Frequency Division Multiplexing (OFDM) modulation unit 405 performs OFDM modulation on the transmission frame input from the frame generation unit 404, and generates wired downlink bandwidth OFDM signals. The OFDM modulation unit 405 outputs the generated wired downlink bandwidth OFDM signals to each of multiplex/demultiplex units 406 and 407, and a wireless modulation sending unit 410.

The multiplex/demultiplex units 406 and 407 multiplex the wired downlink bandwidth OFDM signals input from the OFDM modulation unit 405 and AC signals inputted from the power source unit 415 and generate downlink PLC signals. The multiplex/demultiplex units 406 and 407 output the generated downlink PLC signals to wired output terminals 408 and 409, respectively. The multiplex/demultiplex units 406 and 407 output wired uplink bandwidth OFDM signals input from the wired output terminals 408 and 409 to OFDM demodulation units 411 and 412, respectively.

Power line communication cables are connected to the wired output terminals 408 and 409. The wired output terminals 408 and 409 are for electrical connection with power line communication cables that are connected to the multiplex/demultiplex units 406 and 407, respectively.

The wireless modulation sending unit 410 converts the wired downlink bandwidth OFDM signals input from the OFDM modulation unit 405 to a downlink wireless carrier frequency and generates wireless downlink bandwidth OFDM signals. The wireless modulation sending unit 410 sends the generated wireless downlink bandwidth OFDM signals from a sending antenna.

The OFDM demodulation units 411 and 412 demodulate the wired uplink bandwidth OFDM signals input from the multiplex/demultiplex units 406 and 407, respectively, and regenerate status data relating to the adapters 110 to 115. The OFDM demodulation units 411 and 412 output the regenerated status data relating to the adapters 110 to 115 to the control unit 400.

The wireless reception demodulation unit 413 demodulates wireless uplink bandwidth OFDM signals received with the receiving antenna, and regenerates status data relating to the adapters 110 to 115. The wireless reception demodulation unit 413 outputs the regenerated status data relating to the adapters 110 to 115 to the control unit 400.

A power source plug 414 is connected to the power source outlet, and AC signals are input therefrom. The AC signals input to the power source plug 414 are output to the power source unit 415. The power source unit 415 removes noise from the AC signals inputted from the power source plug 414, and outputs the AC signals to the multiplex/demultiplex units 406 and 407. Also, the power source unit 415 converts the AC signals input from the power source plug 414 to DC signals and supplies the DC signals to each unit of the controller 100.

Figure 5:
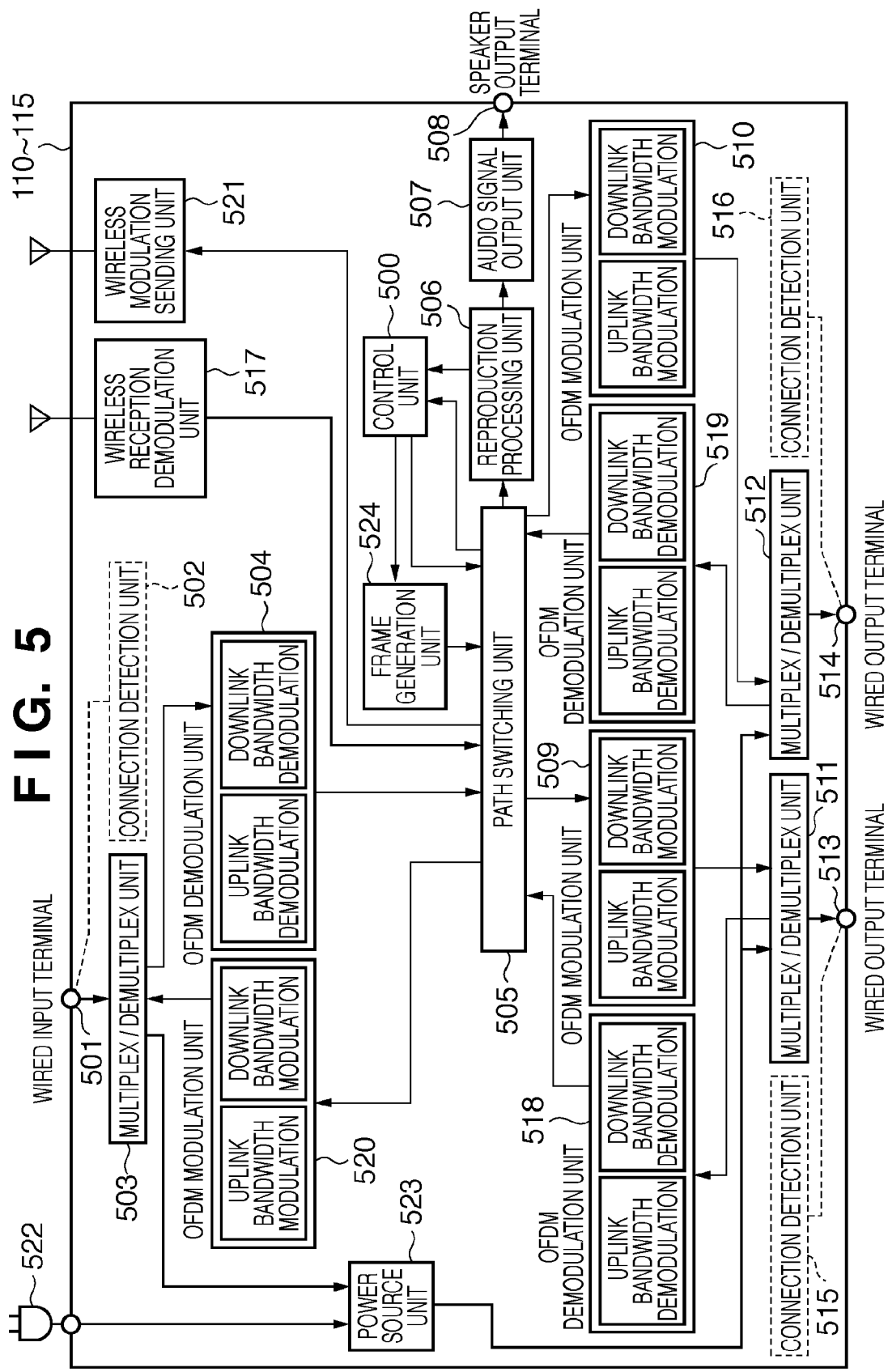
FIG. 5 is a block diagram illustrating an example of a functional configuration of adapters 110 to 115 according to the embodiment of the present invention.

Next, the configuration of the adapters 110 to 115 included in the sound communication system of this embodiment is described with reference to FIG. 5. FIG. 5 is a block diagram illustrating an example of a functional configuration of the adapters 110 to 115 according to the embodiment of the present invention.

A control unit 500 controls each unit of the adapters based on commands and the like input from a reproduction processing unit 506. In FIG. 5, signal lines with each unit are omitted for simplification of the figure. The control unit 500 outputs own status data to a path switching unit 505. When the adapter including the control unit 500 is the temporary master adapter by default, the control unit 500 outputs commands for temporary slave adapters to a frame generation unit 524. Furthermore, when the adapter is the temporary master adapter by default, status data relating to the temporary slave adapters is inputted from the path switching unit 505.

A power line communication cable is connected to a wired input terminal 501. The wired input terminal 501 electrically connects a multiplex/demultiplex unit 503 and the power line communication cable that is connected to the wired input terminal 501. A connection detection unit 502 detects whether or not a power line communication cable is connected to the wired input terminal 501, and notifies the control unit 500 of the result (signal lines are omitted for simplification). Furthermore, connection detection units 515 and 516 detect whether or not a power line communication cable is connected to wired output terminals 513 and 514, respectively, and notify the control unit 500 of the result (signal lines are omitted for simplification).

The multiplex/demultiplex unit 503 demultiplexes the downlink PLC signals or uplink PLC signals input from the wired input terminal 501 into wired downlink bandwidth OFDM signals or wired uplink bandwidth OFDM signals, respectively, and to AC signals. The multiplex/demultiplex unit 503 outputs the demultiplexed wired downlink bandwidth OFDM signals or wired uplink bandwidth OFDM signals, and AC signals to an OFDM demodulation unit 504 and a power source unit 523, respectively. Furthermore, the multiplex/demultiplex unit 503 outputs the wired uplink bandwidth OFDM signals or wired downlink bandwidth OFDM signals inputted from an OFDM modulation unit 520 to the wired input terminal 501.

Multiplex/demultiplex units 511 and 512 multiplex the wired downlink bandwidth OFDM signals or the wired uplink bandwidth OFDM signals inputted from the OFDM modulation units 509 and 510 and AC signals input from the power source unit 523, and generate downlink PLC signals or uplink PLC signals. The multiplex/demultiplex units 511 and 512 output the generated downlink PLC signals or uplink PLC signals to the wired output terminals 513 and 514, respectively. Furthermore, the multiplex/demultiplex units 511 and 512 output the wired uplink bandwidth OFDM signals or wired downlink bandwidth OFDM signals inputted from the wired output terminals 513 and 514, respectively, to OFDM demodulation units 518 and 519, respectively.

The OFDM demodulation units 504, 518, and 519 demodulate the wired downlink bandwidth OFDM signals or wired uplink bandwidth OFDM signals inputted from the multiplex/demultiplex units 503, 511, and 512, respectively. Then, a transmission frame is regenerated from the wired downlink bandwidth OFDM signals, and status data is regenerated from the wired uplink bandwidth OFDM signals. The OFDM demodulation units 504, 518, and 519 output the regenerated transmission frame or status data to the path switching unit 505.

Based on an instruction from the control unit 500, the OFDM demodulation units 504, 518, and 519 execute different demodulation processing according to the modes shown in FIG. 6A to FIG. 6C. For example, in the case of mode 10, the OFDM demodulation unit 504 executes demodulation processing on the wired downlink bandwidth OFDM signals, and the OFDM demodulation units 518 and 519 execute demodulation processing on the wired uplink bandwidth OFDM signals.

Based on an instruction from the control unit 500, the path switching unit 505 switches data paths according to the modes shown in FIG. 6A to FIG. 6C. For example, in the case of mode 10, the path switching unit 505 outputs downlink data (transmission frame) input from the OFDM demodulation unit 504 to the reproduction processing unit 506 and the OFDM modulation units 509 and 510. Furthermore, the path switching unit 505 outputs uplink data (that is, own status data and status data relating to all the adapters connected downstream of itself) inputted from the control unit 500 and the OFDM demodulation units 518 and 519 to the OFDM modulation unit 520.

The reproduction processing unit 506 obtains commands and audio data of a channel assigned to itself from transmission frames input from the path switching unit 505. The reproduction processing unit 506 outputs the obtained audio data to an audio signal output unit 507. Furthermore, the reproduction processing unit 506 outputs the obtained commands to the control unit 500.

The audio signal output unit 507 performs D/A conversion of audio data input from the reproduction processing unit 506, amplifies the data, and generates audio signals. The audio signal output unit 507 outputs the generated audio signals to a speaker output terminal 508. At this time, based on an instruction from the control unit 500, the audio signal output unit 507 generates audio signals at a predetermined timing in order to properly reproduce multi-channel audio data, and outputs the signals to the speaker output terminal 508.

A speaker is connected to the speaker output terminal 508. The OFDM modulation units 509, 510, and 520 perform OFDM modulation on the transmission frame or status data input from the path switching unit 505, and output the modulated transmission frame or status data to the multiplex/demultiplex units 511, 512, and 503, respectively. Based on an instruction from the control unit 500, the OFDM modulation units 509, 510, and 520 execute different modulation processing according to the modes shown in FIG. 6A to FIG. 6C. For example, in the case of mode 10, the OFDM modulation units 509 and 510 execute modulation processing to generate wired downlink bandwidth OFDM signals. The OFDM modulation unit 520 executes modulation processing to generate wired uplink bandwidth OFDM signals.

Power line communication cables are connected to the wired output terminals 513 and 514. The wired output terminals 513 and 514 are for electrical connection with power line communication cables that are connected to the multiplex/demultiplex units 511 and 512, respectively.

A wireless reception demodulation unit 517 demodulates the wireless downlink bandwidth OFDM signals received with the receiving antenna, and regenerates a transmission frame. The wireless reception demodulation unit 517 outputs the regenerated transmission frame to the path switching unit 505. A wireless modulation sending unit 521 performs OFDM modulation on the status data inputted from the path switching unit 505, converts the modulated status data to an uplink wireless carrier frequency, and generates wireless uplink bandwidth OFDM signals. The wireless modulation sending unit 521 sends the generated wireless uplink bandwidth OFDM signals from the sending antenna.

A power source plug 522 is connected to a power source outlet, and AC signals are input therefrom. The AC signals input to the power source plug 522 are output to the power source unit 523. The power source unit 523 removes noise from the AC signals input from the wired input terminal 501 or power source plug 414, and outputs the AC signals to the multiplex/demultiplex units 511 and 512. Also, the power source unit 523 converts the AC signals input from the wired input terminal 501 or power source plug 522 to DC signals and supplies the DC signals to each unit of the adapter.

In this embodiment, the power source unit 523 selects the AC signal source based on the presence or absence of AC signal input from the power source plug 522. The power source unit 523 selects the power source plug 522 as the AC signal source when there is AC signal input from the power source plug 522. When there is no AC signal input from the power source plug 522, the power source unit 523 selects the multiplex/demultiplex unit 503 as the AC signal source.

The frame generation unit 524 allocates the commands input from the control unit 500 to time slots of the synchronous transmission frames, and generates a transmission frame. At this time, the frame generation unit 524 allocates null data to the time slots for generated transmission frame to the path switching unit 505.

Next, modes according to the embodiment of the present invention are described with reference to FIG. 6A to FIG. 6C. FIG. 6A to FIG. 6C show diagrams illustrating data paths in respective modes of the adapters 110 to 115 according to the embodiment of the present invention.

The path switching unit 505 switches the data path according to the modes shown in FIG. 6A to FIG. 6C. Furthermore, the OFDM demodulation units 504, 518, and 519 execute different demodulation processing according to the modes shown in FIG. 6A to FIG. 6C. The OFDM modulation units 509, 510, and 520 execute different modulation processing according to the modes as shown in FIG. 6A to FIG. 6C.

For example, in the case of mode 10, downlink data is input from the wired input terminal 501, demodulation processing is executed on the wired downlink bandwidth OFDM signals in the OFDM demodulation unit 504, and the signals are input to the reproduction processing unit 506 and the OFDM modulation units 509 and 510. The downlink data input to the OFDM modulation units 509 and 510 goes through modulation processing for creating wired downlink bandwidth OFDM signals, and is output from the wired output terminals 513 and 514, respectively.

The uplink data is generated in the control unit 500 (own status data), or input from the wired output terminals 513 and 514 (status data relating to all the adapters connected downstream of itself), and input to the OFDM modulation unit 520. The uplink data input to the OFDM modulation unit 520 goes through modulation processing for creating wired uplink bandwidth OFDM signals, and is output from the wired input terminal 501.

The data path in a wireless connection adapter group is described hereinafter. Each device executes processing for determining a data path in initial setting processing such as the processing executed immediately after the device is powered on. Each device starts processing for transmitting audio data after completing the initial setting processing.

Note that FIG. 6A to FIG. 6C do not indicate that all the data paths have to be used in an adapter that has shifted its mode. For example, in the adapter shifted to mode 10, when the power line communication cable is not yet connected to the wired output terminal 514, the downlink data obtained by the demodulation processing on the wired downlink bandwidth OFDM signals in the OFDM demodulation unit 504 does not have to be input to the OFDM modulation unit 510. At that time, operation of the OFDM modulation unit 510 and the OFDM demodulation unit 519 on the data input/output in the wired output terminal 514 may be stopped.

In FIG. 6A to FIG. 6C, mode 00 is a mode used at the time of performing initial setting for determining the master adapter, and is set in an adapter acting as a temporary master adapter. Mode 10 is a mode used at the time of performing initial setting for determining the master adapter, and is set in an adapter acting as a temporary slave adapter before the connection configuration is known. Mode 10 is set in, among the adapters acting as slave adapters, an adapter connected to an adapter in the uplink direction with the wired input terminal 501. Mode 10 is also used at the time of performing initial setting.

Mode 20 is set in an adapter acting as the master adapter. Mode 21 is set in, among the adapters acting as slave adapters, an adapter connected to an adapter in the uplink direction with the wired output terminal 513. Mode 22 is set in, among the adapters acting as slave adapters, an adapter connected to an adapter in the uplink direction with the wired output terminal 514.

Figure 7:
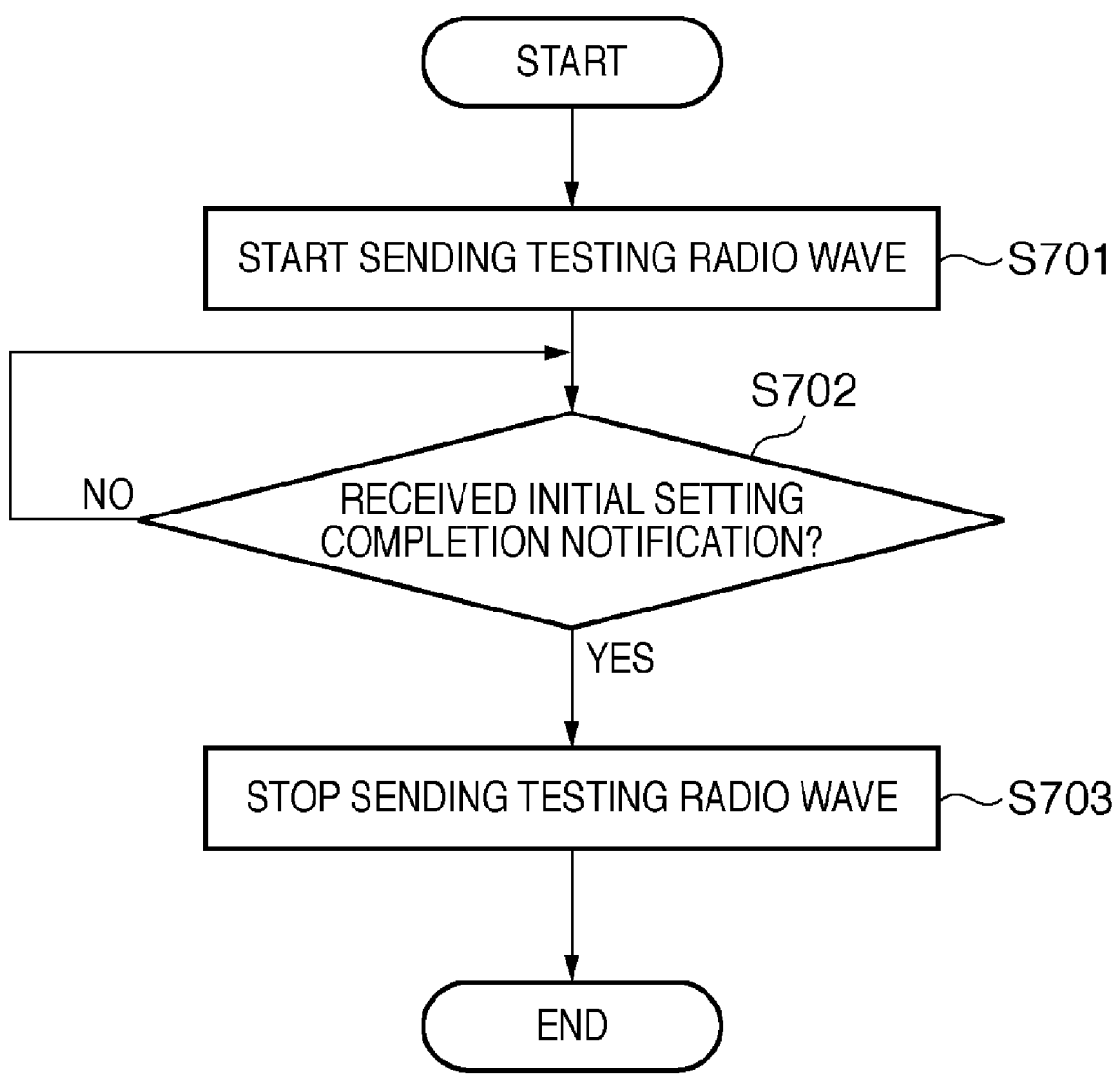
FIG. 7 is a flowchart illustrating an example of processing relating to a determination of a data path in a wireless connection adapter group by the controller 100 according to the embodiment of the present invention.

Next, processing by the controller 100 with regard to a determination of a data path in a wireless connection adapter group is described with reference to FIG. 7. FIG. 7 is a flowchart illustrating an example of processing by the controller 100 with regard to a determination of a data path in a wireless connection adapter group according to the embodiment of the present invention. The processing in the flowchart of FIG. 7 is carried out by the control unit 400 executing corresponding processing programs to control each block.

In step S701, the controller 100 starts sending a testing radio wave from the wireless modulation sending unit 410. The testing radio wave may include data that is known to the controller 100 and the adapters 110 to 115. When the controller 100 has started sending the testing radio wave, the process moves to step S702.

In step S702, the controller 100 waits for reception of an initial setting completion notification that notifies completion of initial setting of the wireless connection adapter group, from all of the wireless connection adapter groups. When the controller 100 has received the initial setting completion notification from all the wireless connection adapter groups, the process moves to step S703.

In step S703, the controller 100 stops the sending of the testing radio wave. When the controller 100 has stopped the sending of the testing radio wave, the processing with regard to a determination of a data path in the wireless connection adapter group ends.

Figure 8:
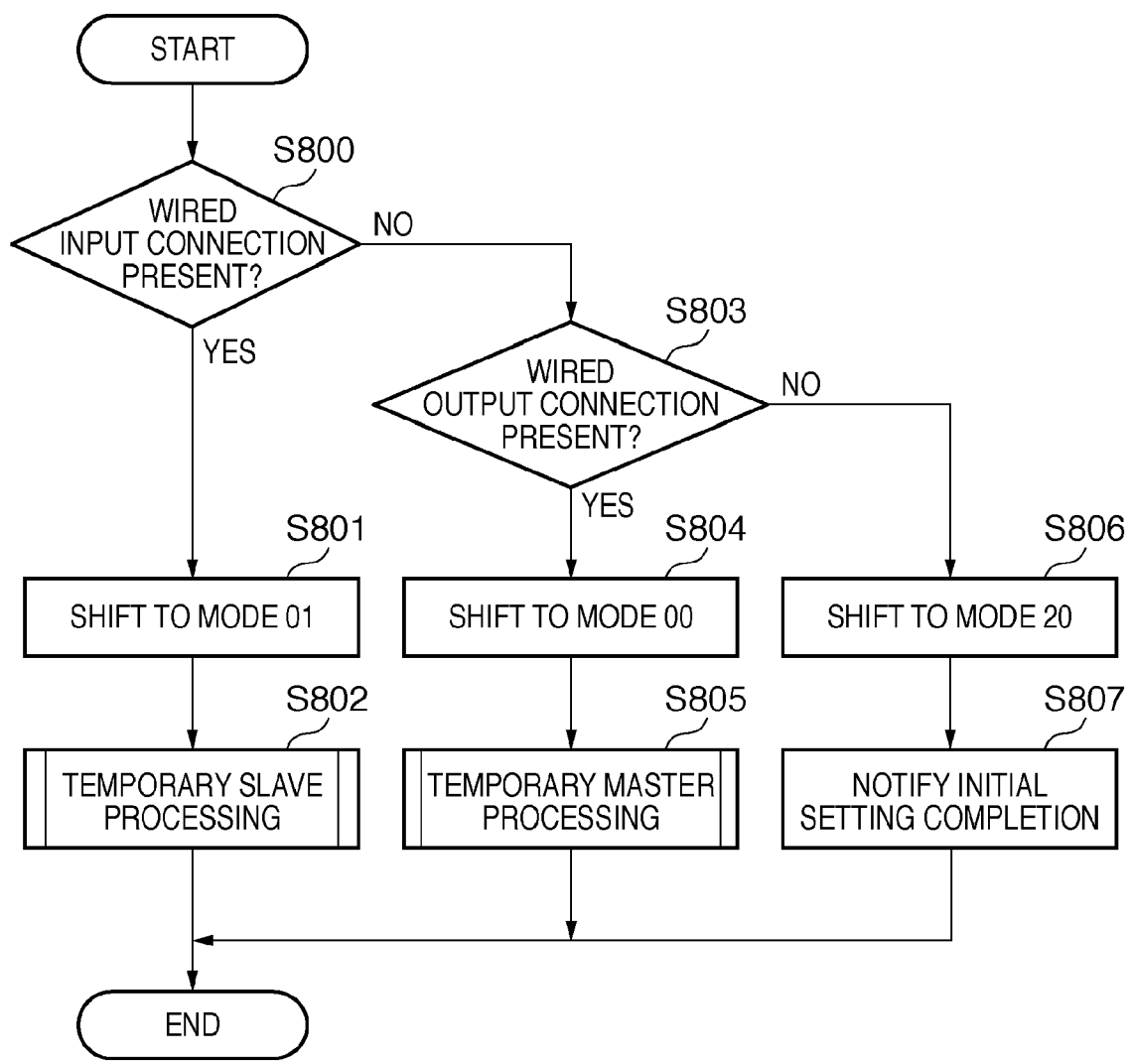
FIG. 8 is a flowchart illustrating an example of processing relating to a determination of a data path by each adapter according to the embodiment of the present invention.

Next, communication control processing by each adapter with regard to a determination of a data path is described with reference to FIG. 8. FIG. 8 is a flowchart illustrating an example of communication control processing relating to a determination of a data path by each adapter according to the embodiment of the present invention. The processing in the flowchart of FIG. 8 is carried out by a control unit 500 executing corresponding processing programs to control each block. The processing below is executed in respective adapters 110 to 115.

In step S800, the adapter detects whether or not a power line communication cable is connected to the wired input terminal 501. This processing is executed in order to determine adapters that do not receive power supply from other adapters. When the adapter is connected to a power line communication cable, the process moves to step S801. When the adapter is not connected to a power line communication cable, the process moves to step S803.

In step S801, the adapter shifts its mode to mode 01 (FIG. 6A). When the adapter mode has shifted to mode 01, the process moves to step S802. Hereinafter, this adapter is referred to as a "temporary slave adapter". In step S802, the temporary slave adapter executes temporary slave processing. The temporary slave processing is described later in detail with reference to FIG. 10. When the temporary slave adapter has completed the temporary slave processing, the processing with regard to the data path determination ends.

In step S803, the adapter detects whether or not a power line communication cable is connected to the wired output terminal 513 or 514. When the adapter has been connected with a power line communication cable, the process moves to step S804. When the adapter has not been connected with a power line communication cable, the process moves to step S806. In step S804, the adapter mode is shifted to mode 00. When the adapter mode has shifted to mode 00, the process moves to step S805. Hereinafter, this adapter is referred to as a "temporary master adapter". In step S805, the temporary master adapter executes temporary master processing. The temporary master processing is described later in detail with reference to FIG. 9. When the temporary master adapter has completed the temporary master processing, the processing with regard to the data path determination ends.

In step S806, the adapter shifts its mode to mode 20. When the adapter mode has shifted to mode 20, the process moves to step S807. Hereinafter, this adapter is referred to as a "master adapter".

In step S807, the master adapter sends an initial setting completion notification that notifies the completion of its own initial settings to the controller 100. When the master adapter has sent the initial setting completion notification to the controller 100, the processing with regard to the data path determination ends.

As a result of the processing in steps S801 and S804, the path for downlink data in the wireless connection adapter group becomes the same as that of AC signals. For example, in the case of the connection configuration shown in FIG. 1, the adapter 112 becomes a temporary master adapter, and the adapters 110 and 111 become the temporary slave adapters. Then, downlink data sent by the adapter 112 to the adapters 110 and 111 is transmitted from the adapter 112 to the adapter 111, and from the adapter 111 to the adapter 110.

Figure 9:
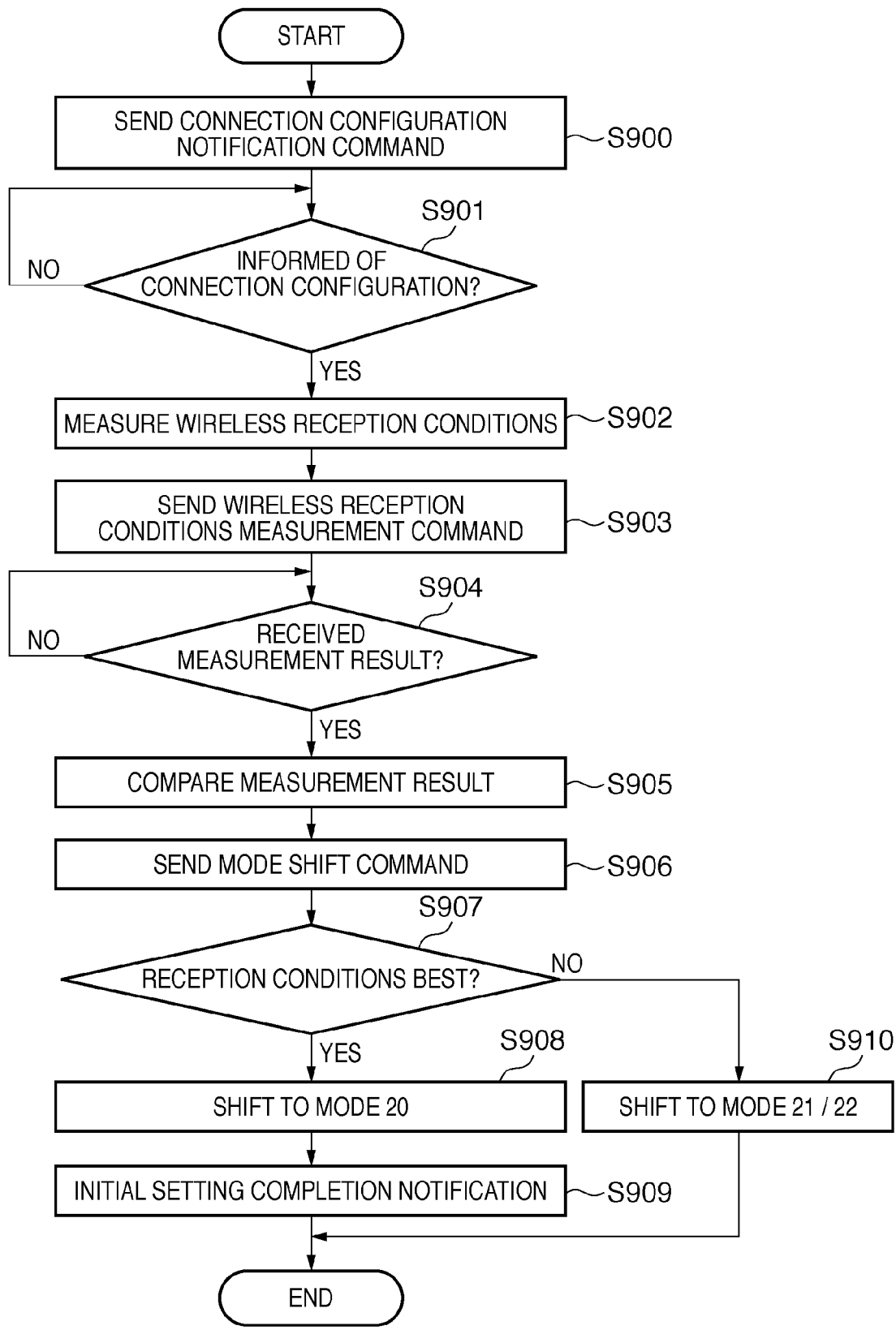
FIG. 9 is a flowchart illustrating an example of temporary master processing in step S805 of FIG. 8 according to the embodiment of the present invention.

Next, the temporary master processing in step S805 of FIG. 8 is described in detail with reference to FIG. 9. FIG. 9 is a flowchart illustrating an example of temporary master processing in step S805 of FIG. 8 according to the embodiment of the present invention.

In step S900, the temporary master adapter sends a connection configuration notification command that requests the temporary slave adapters in the wireless connection adapter group to which the temporary master adapter belongs to notify the connection configuration. When the temporary master adapter has sent the connection configuration notification command, the process moves to step S901.

In step S901, the temporary master adapter waits for reception of connection configuration information that indicates a connection configuration from all of the temporary slave adapters that are connected to the wired output terminals 513 and 514. The temporary master adapter is informed of the connection configuration of the wireless connection adapter group to which the temporary master adapter belongs from the connection configuration information. In each adapter, the connection configuration information is information indicating the connection relationship between itself and adapters positioned in the downlink direction, and is described in detail with reference to FIG. 11 later on. The connection configuration information is a kind of status data, and is transmitted as uplink data. When the temporary master adapter has become informed of the connection configuration of the wireless connection adapter group, the process moves to step S902.

In step S902, the temporary master adapter starts the wireless reception demodulation unit 517, and measures wireless reception conditions (also referred to as "wireless connection conditions"). The measurement of the wireless reception conditions is performed, for example, by measuring the bit error ratio using the field intensity of the testing radio wave sent by the controller 100, and data known to the controller 100, and the adapters 110 to 115. When the temporary master adapter has measured the wireless reception conditions, the process moves to step S903.

In step S903, the temporary master adapter sends, to the temporary slave adapters in the wireless connection adapter group to which the temporary master adapter belongs, a wireless reception conditions measurement command that requests the temporary slave adapters to measure wireless reception conditions and to report the measurement result to the temporary master adapter. When the temporary master adapter has sent the wireless reception conditions measurement command, the process moves to step S904.

In step S904, the temporary master adapter waits for reception of the wireless reception conditions measurement result from all the temporary slave adapters in the wireless connection adapter group to which the temporary master adapter belongs. The wireless reception conditions measurement result is transmitted as uplink data, as a type of status data. When the temporary master adapter has received the measurement result from all the temporary slave adapters, the process moves to step S905.

In step S905, the temporary master adapter compares the wireless reception conditions measurement results of all the adapters in the wireless connection adapter group to which the temporary master adapter belongs, including the temporary master adapter. When the temporary master adapter has compared the wireless reception conditions measurement results, the process moves to step S906.

In step S906, the temporary master adapter sends a mode shift command that requests the temporary slave adapters in the wireless connection adapter group to which the temporary master adapter belongs to perform a mode shift, based on the wireless reception conditions comparison result and connection configuration of the wireless connection adapter group. At this time, the temporary master adapter requests the temporary slave adapters to shift their modes so that an adapter with the best wireless reception conditions wirelessly receives data that is sent from the controller 100 to the adapters 110 to 115 and distributes the data to other adapters via a wired connection.

Hereinafter, an adapter that has the best wireless reception conditions, wirelessly receives the data sent from the controller 100 to the adapters 110 to 115, and distributes the data to the other adapters is referred to as the "master adapter". Also, other adapters in the wireless connection adapter group are referred to as "slave adapters".

In step S907, the temporary master adapter determines whether or not its own wireless reception conditions are the best in the wireless connection adapter group to which the temporary master adapter belongs. Based on the determination result, when the wireless reception conditions of the temporary master adapter itself have been the best, the process moves to step S908. When the wireless reception conditions of the temporary master adapter itself have not been the best, the process moves to step S910.

In step S908, the temporary master adapter shifts its mode to mode 20, becoming the master adapter. When the temporary master adapter has shifted its mode to mode 20, the process moves to step S909.

In step S909, the temporary master adapter (already the master adapter) sends, to the controller 100, an initial setting completion notification that notifies the completion of the initial settings of the wireless connection adapter group to which the temporary master adapter belongs. When the temporary master adapter has sent the initial setting completion notification, the temporary master processing ends.

In step S910, the temporary master adapter shifts its mode to mode 21 or mode 22 based on the connection configuration of the wireless connection adapter group, and becomes a slave adapter. At this time, the temporary master adapter shifts its mode so as to receive data sent from the controller 100 to the adapters 110 to 115 and received by the master adapter. When the temporary master adapter has shifted its mode, the temporary master processing ends.

Figure 10:
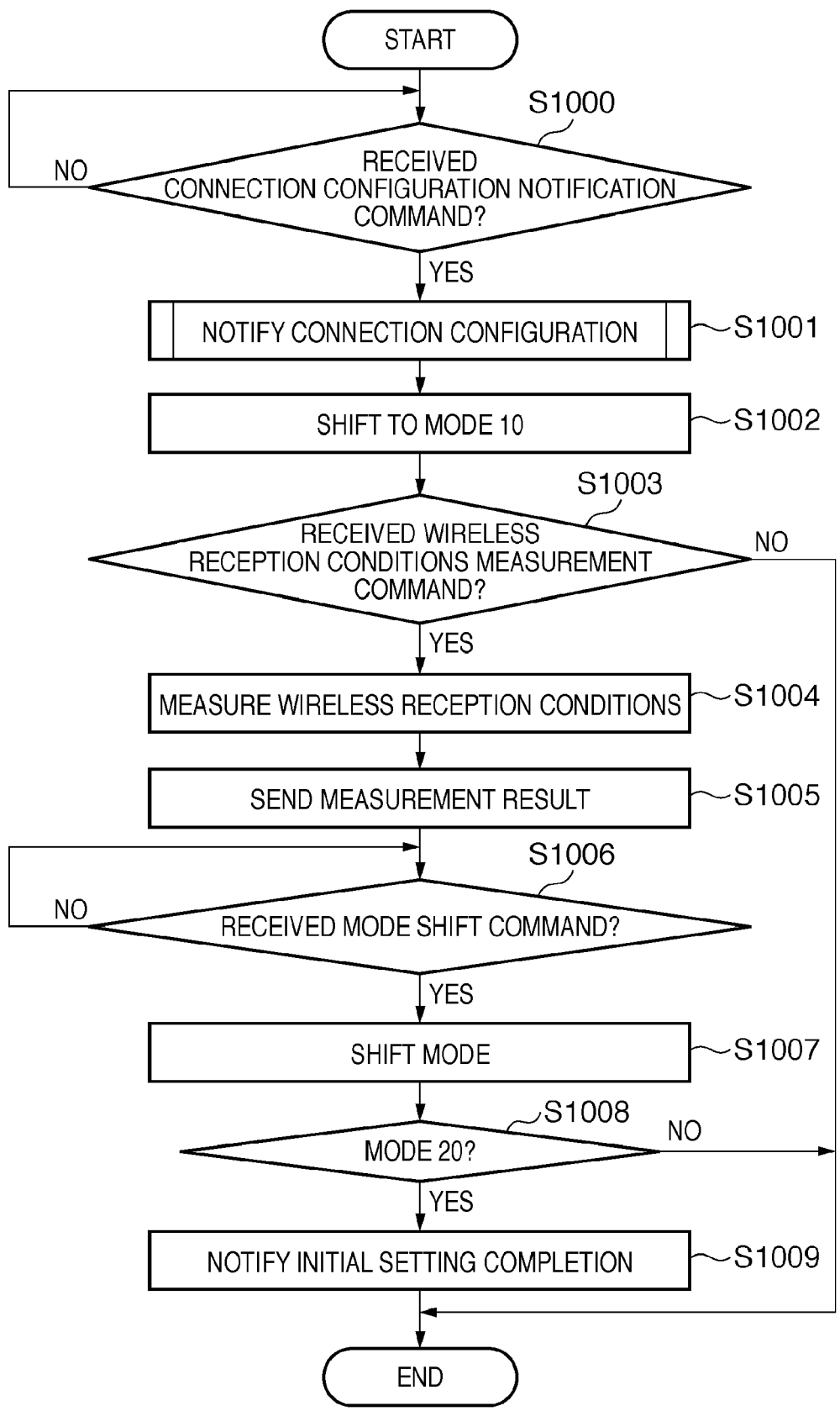
FIG. 10 is a flowchart illustrating an example of temporary slave processing in step S802 of FIG. 8 according to the embodiment of the present invention.

Next, the temporary slave processing in step S802 of FIG. 8 is described in detail with reference to FIG. 10. FIG. 10 is a flowchart illustrating an example of temporary slave processing in step S802 of FIG. 8 according to the embodiment of the present invention.

In step S1000, the temporary slave adapter waits for reception of the connection configuration notification command. When the temporary slave adapter has received the connection configuration notification command, the process moves to step S1001.

In step S1001, the temporary slave adapter executes connection configuration notification processing. The connection configuration notification processing is described later with reference to FIG. 11. When the temporary slave adapter has completed the connection configuration notification processing, the process moves to step S1002. In step S1002, the temporary slave adapter shifts its mode to mode 10. As a result, the flow of uplink data in the wireless connection adapter group becomes the reverse of the flow of downlink data. When the temporary slave adapter has shifted its mode to mode 10, the process moves to step S1003.

In step S1003, the temporary slave adapter waits for reception of a wireless reception conditions measurement command. When the temporary slave adapter has received the wireless reception conditions measurement command within a predetermined time period, the process moves to step S1004. When the slave adapter has not received the wireless reception conditions measurement command within a predetermined time period, the temporary slave processing ends. That is, that temporary slave adapter continues to be the slave adapter.

In step S1004, the temporary slave adapter starts the wireless reception demodulation unit 517, and measures wireless reception conditions. When the temporary slave adapter has measured the wireless reception conditions, the process moves to step S1005. In step S1005, the temporary slave adapter sends the wireless reception conditions measurement result to the temporary master adapter. When the temporary slave adapter has sent the measurement result, the process moves to step S1006.

In step S1006, the temporary slave adapter waits for reception of a mode shift command. When the temporary slave adapter has received the mode shift command, the process moves to step S1007. In step S1007, the temporary slave adapter shifts its mode according to the received mode shift command. When the temporary slave adapter has completed the mode shift, the process moves to step S1008.

In step S1008, the temporary slave adapter determines whether or not the temporary slave adapter itself is in mode 20. When the temporary slave adapter itself has been in mode 20 based on the determination result, that is, when it has been the master adapter, the process moves to step S1009. When the temporary slave adapter itself is not in mode 20, that is, when it is a slave adapter, the temporary slave processing ends.

In step S1009, the temporary slave adapter (already the master adapter) sends, to the controller 100, an initial setting completion notification that notifies completion of the initial settings of the wireless connection adapter group to which the temporary slave adapter belongs. When the temporary slave adapter has sent the initial setting completion notification to the controller 100, the temporary slave processing ends.

Figure 11:
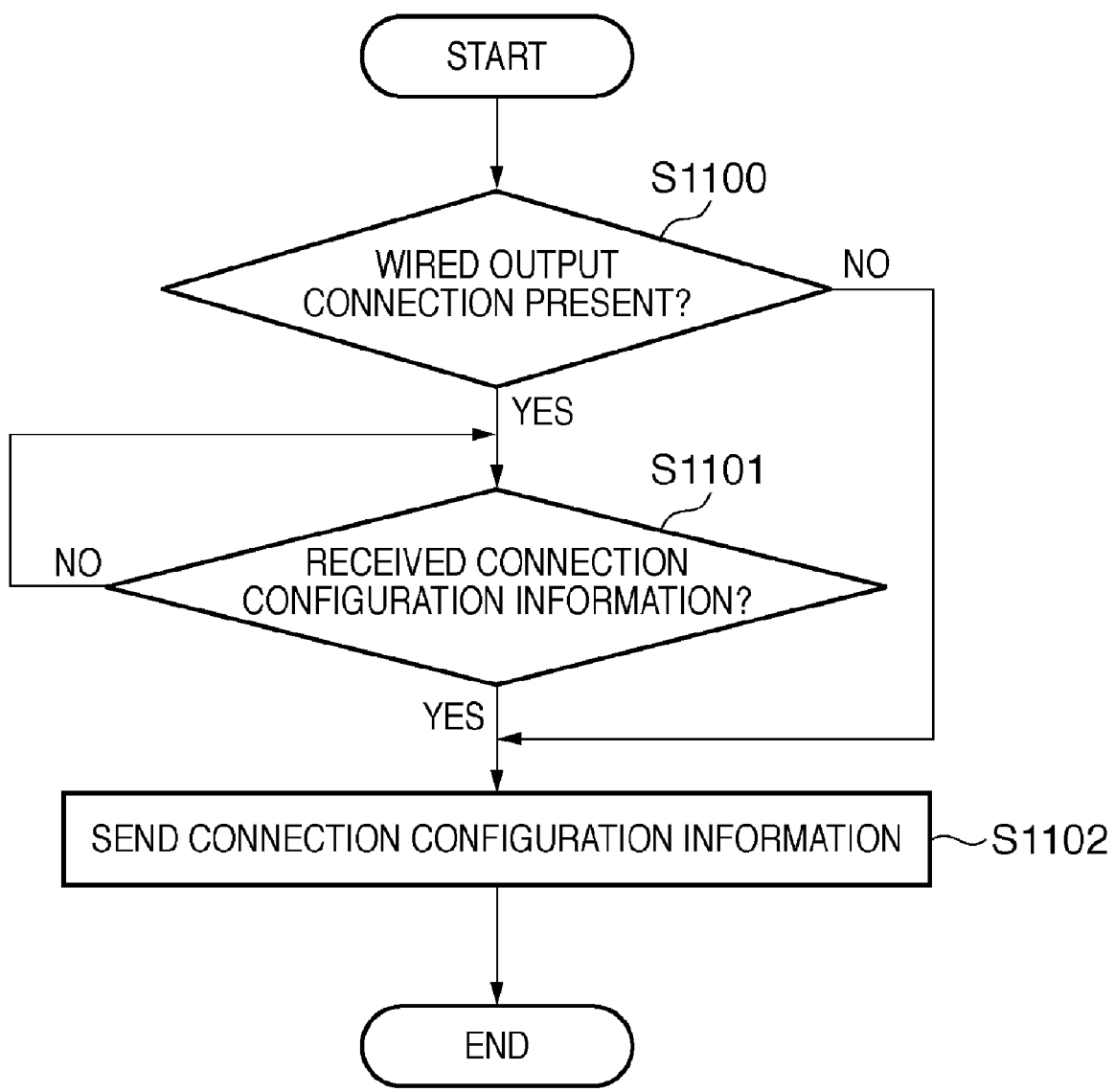
FIG. 11 is a flowchart illustrating an example of connection configuration notification processing in step S1001 of FIG. 10 according to the embodiment of the present invention.

Next, the connection configuration notification processing in step S1001 of FIG. 10 is described in detail with reference to FIG. 11. FIG. 11 is a flowchart illustrating an example of connection configuration notification processing in step S1001 of FIG. 10 according to the embodiment of the present invention.

In step S1100, the temporary slave adapter determines whether or not adapters are connected to the wired output terminals 513 and 514. When adapters have been connected to the wired output terminals 513 and 514 of the temporary slave adapter, the process moves to step S1101. When adapters have not been connected to the wired output terminals 513 and 514 of the temporary slave adapter, the process moves to step S1102.

In step S1101, the temporary slave adapter waits for reception of connection configuration information from all the adapters connected to the wired output terminals 513 and 514. When the temporary slave adapter has received connection configuration information from all the adapters, the process moves to step S1102.

In step S1102, the temporary slave adapter generates new connection configuration information by adding, to the received connection configuration information, the terminal number of the terminal that received the connection configuration information and an identification mark identifying the temporary slave adapter itself. An identification mark is assigned to each adapter in advance, and may be, for example, information indicating an audio data channel assigned the slave adapter itself. For wired output terminals to which adapters are not connected, information indicating such is regarded as connection configuration information received from these wired output terminals.

In step S1102, the temporary slave adapter further sends the generated connection configuration information to the adapters connected to the wired input terminal 501. When the temporary slave adapter has sent the connection configuration information, the connection configuration notification processing ends.

The processing relating to the temporary master adapter becoming informed of the connection configuration (steps S900 to S901, step S1001, steps S1100 to S1102, and the like) is not limited to the example shown in this embodiment. Therefore, an arbitrary algorithm for informing the network connection configuration other than the example shown may be used as well.

Hereinafter, processing for determining a data path in the wireless connection adapter group is described in detail in the case of the connection configuration of FIG. 1.

When the wireless connection adapter group of the adapters 110 to 112 is powered on, the adapter 112 whose wired input terminal 501 is not connected to a power line communication cable becomes a temporary master adapter (mode 00). The adapters 110 and 111 whose wired input terminals 501 are connected to power line communication cables become temporary slave adapters (mode 01). When the processing relating to informing the connection configuration has been completed, the adapters 110 and 111 shift their modes to mode 10.

At this time, downlink data (command) sent by the adapter 112 is transmitted from the adapter 112 to the adapter 111, and from the adapter 111 to the adapter 110 via wired connections. The path for uplink data is the reverse of the path for downlink data. Then, the adapter 112 measures the wireless reception conditions of the radio wave sent from the controller 100, and requests the adapters 110 and 111 to perform the measurement as well. The adapter 112 compares the wireless reception conditions measurement results, and sets the adapter with the best wireless reception conditions as the master adapter (mode 20).

When it is assumed that the wireless reception conditions of the adapter 110 are the best, the adapter 112 sets the adapters 110, 111, and 112 as a master adapter (mode 20), a slave adapter (mode 21), and a slave adapter (mode 21), respectively. In this case, the adapter 111 is connected to the adapter 110 with the wired output terminal 513, and the adapter 112 is connected to the adapter 111 with the wired output terminal 513.

At this time, the downlink data sent by the controller 100 to the adapters 110 to 115 is transmitted wirelessly from the controller 100 to the adapter 110, and transmitted via a wired connection from the adapter 110 to the adapter 111, and from the adapter 111 to the adapter 112. The path for uplink data is the reverse of the path for downlink data.

A case when the wireless reception conditions of the adapter 111 are the best is illustrated as another example. In this case, the adapter 112 sets the adapters 110, 111, and 112 as a slave adapter (mode 10), a master adapter (mode 20), and a slave adapter (mode 21), respectively. In this case, the adapter 110 is connected to the adapter 111 with the wired input terminal 501. At this time, the downlink data sent by the controller 100 to the adapters 110 to 115 is transmitted wirelessly from the controller 100 to the adapter 111, and transmitted via a wired connection from the adapter 111 to the adapter 110 and the adapter 112. The path for uplink data is the reverse of the path for downlink data.

A case when the wireless reception conditions of the adapter 112 are the best is illustrated as yet another example. In this case, the adapter 112 sets the adapters 110, 111, and 112 as a slave adapter (mode 10), a slave adapter (mode 10), and a master adapter (mode 20), respectively. In this case, the adapter 111 is connected to the adapter 112 with the wired input terminal 501. At this time, the downlink data sent by the controller 100 to the adapters 110 to 115 is transmitted wirelessly from the controller 100 to the adapter 112, and transmitted via a wired connection from the adapter 112 to the adapter 111, and from the adapter 111 to the adapter 110. The path for uplink data is the reverse of the path for downlink data.

According to this embodiment described above, because the temporary master adapter is determined based on whether or not power line communication cables are connected to the wired input terminals of the adapters, a single temporary master adapter can be determined comparatively easily for every wireless connection adapter group.

Furthermore, according to this embodiment, because modulation/demodulation processing in the modulation/demodulation unit of an adapter is changed according to the connection configuration, compatibility with asymmetrical duplex communication can be achieved. Furthermore, according to this embodiment, by providing the path switching unit, compatibility with various connection configurations can be achieved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-063159, filed Mar. 12, 2008, which is hereby incorporated by reference herein in its entirety.

What is claimed is:

1. A method of controlling communication in a communication system including a controller that wirelessly transmits multi-channel data to a plurality of communication devices executed in a communication device group, in which the plurality of communication devices are wire-connected, one of the plurality communications devices receiving power supply directly from a power source and each of the other communication devices receiving power supply from another communication device in the communication device group, the method comprising the steps of:

determining a temporary master as a communication device from the communication device group that receives power from the power source;

determining by the temporary master, in the communication device group, a master communication device that receives the multi-channel data from the controller and sends the received multi-channel data to other communication devices in the communication device group according to wireless connection conditions between the controller and each communication device in the communication device group; and sending, by the master, via the wire-connections the multi-channel data received wirelessly from the controller to the other communication devices in the communication device group.

2. The method of controlling communication according to claim 1, wherein in said step of determining a temporary master, it is determined whether or not a power line communication cable, having one end connected either to a power line or to another communication device in the communication device group, has another end connected to a predetermined connector of one of the communication devices in the communication device group.

3. The method of controlling communication according to claim 1, wherein connections between the communication devices included in the communication device group are made via one or more power line communication cables via which the multi-channel data and electric power are multiplexed and transmitted.

4. The method of controlling communication according to claim 1, further comprising a step of supplying, by the temporary master, power through a power line communication cable to the communication device that is connected to the temporary master in the communication device group.

5. The method of controlling communication according to claim 4, further comprising a step of supplying by the communication device that receives the power supply from the temporary master through the power line communication cable, power, via the power line communication cable, to another communication device that is further connected to the communication device that receives the power supply from the temporary master.

6. The method of controlling communication according to claim 3, wherein in said sending step, the master sends the multi-channel data through the power line communication cable to communication devices in the communication device group that are connected to the master.

7. The method of controlling communication according to claim 6, further comprising a step of sending, by the communication device that receives the multi-channel data from the master through the power line communication cable, the multi-channel data, via the power line communication cable, to another communication device that is further connected to the communication device that receives the multi-channel data from the master.

8. A communication system including a a controller that wirelessly transmits multi-channel data to a plurality of communication devices executed in communication device group, in which the plurality of communication devices are wire-connected, one of the plurality of communication devices receiving power supply directly from a power source and each of the other communication devices receiving a power supply from another communication device in the communication device group, the system comprising:
    a determination unit configured to determine a temporary maser as a communication device from the communication device group that receives power from the power source;
    a determination unit of the temporary master configured to determine, in the communication device group, a master communication device that receives the multi-channel data from the controller and sends the received multi-channel data to other communication devices in the communication device group, according to wireless connection conditions between the controller and each communication device in the communication device group; and a sending unit of the master configured to send the multi-channel data received wirelessly from the controller to the other communication devices in the communication device group.

9. A method of controlling communication in a communication system including a controller that wirelessly transmits multi-channel data to a plurality of communication devices executed in a communication device group, in which the plurality of communication devices are wire-connected, one of the plurality of communication devices receiving power supply directly from a power source and each of the other communication devices receiving power supply from another communication device in the communication device group, the method comprising in each of the plurality of the communication devices:
    determining whether the communication device receives power supply from another communication device in the communication device group or not;
    determining, if the communication device does not receive power supply from any other communication device, a master communication device in the communication device group as a communication device that receives the multi-channel data from the controller wirelessly, wherein the master communication device is determined according to wireless connection conditions between the controller and each communication device in the communication device group; and
    sending, if the communication device is determined to be the maser communication device, the multi-channel data received wirelessly from the controller to the other communication devices in the communication device group via wired connections.

10. A communication device in a communication system, including a controller that wirelessly transmits multi-channel data to a plurality of communication devices comprising the communication device and executed in a communication device group, in which the plurality of communication devices are wire-connected, one of the plurality of communication devices receiving power supply directly from a power source and each of the other communication devices receiving a power supply from another communication device in the communication device group, the communication device comprising:
    a determination unit configured to determine whether the communication device receives power supply from another communication device in the communication device group or not;
    a determination unit configured to determine, if the communication device does not receive power supply from any other communication device in the communication device group, a master communication device in the communication device group as a communication device that receives the multi-channel data from the controller wirelessly, wherein the master communication device is determined according to wireless connection conditions between the controller and each communication device in the communication device group, and
    a sending unit configured to send, if the communication device is determined to be the master communication device, the multi-channel data received wirelessly from the controller to the other communication devices in the communication device group via wired connections.

11. A computer program, stored in a non-transitory computer-readable medium, which causes a computer to execute a method of controlling communication in a communication system including a controller that wirelessly transmits multi-channel data to a plurality of communication devices executed in a communication device group, in which the plurality of communication devices are wire-connected, one of the plurality communications devices receiving power supply directly from a power source and each of the other communication devices receiving power supply from another communication device in the communication device group, the method comprising the steps of:
    determining a temporary master as a communication device from the communication device group that receives power from the power source;
    determining by the temporary master, in the communication device group, a master communication device that receives the multi-channel data from the controller and sends the received multi-channel data to other communication devices in the communication device group, according to wireless connection conditions between the controller and each communication device in the communication device group; and
    sending, by the master via the wire-connection, the multi-channel data received wirelessly from the controller to the other communication devices in the communication device group.

12. A computer program, stored in a non-transitory computer- readable medium, which causes a computer to execute a method of controlling communication in a communication system including a controller that wirelessly transmits multi-channel data to a plurality of communication devices executed in a communication device group, in which a plurality of communication devices are wire-connected, one of the plurality of communication devices receiving power supply directly from a power source and each of the other communication devices receiving power supply from another communication device in the communication device group, the method comprising in each of the plurality of the communication devices:
- determining whether the communication device receives power supply from another communication device in the communication device group or not;
- determining, if the communication device does not receive power supply from any other communication device, a master communication device in the communication device group as a communication device that receives the multi-channel data from the controller wirelessly, wherein the master communication device is determined according to wireless connection conditions between the controller and each communication device in the communication device group; and
- sending, if the communication device is determined to be the master communication device, the multi-channel data received wirelessly from the controller to the other communication devices in the communication device group via wired connections.

* * * * *